United States Patent [19]
Spickelmire

[11] Patent Number: 5,165,196
[45] Date of Patent: Nov. 24, 1992

[54] FISH LINE RUDDER

[75] Inventor: W. James Spickelmire, Grangeville, Id.

[73] Assignee: Gem Tackle Company, Grangeville, Id.

[21] Appl. No.: 747,525

[22] Filed: Aug. 20, 1991

Related U.S. Application Data

[63] Continuation-in-part of Ser. No. 530,067, May 29, 1990.

[51] Int. Cl.⁵ ............................................. A01K 95/00
[52] U.S. Cl. ................................................. 43/43.13
[58] Field of Search ................. 43/43.13, 43.12, 44.88, 43/44.9

[56] References Cited

U.S. PATENT DOCUMENTS

| | | | |
|---|---|---|---|
| D. 217,644 | 5/1970 | Smith | 43/43.13 |
| 1,320,804 | 11/1919 | Squarebriggs | 43/43.13 |
| 2,255,465 | 9/1941 | Hickey | 43/49 |
| 2,412,399 | 12/1946 | Henricks | 43/43.13 |
| 2,566,029 | 8/1951 | Louthan | 43/43.13 |
| 2,605,577 | 8/1952 | Waugler | 43/43.13 |
| 2,726,475 | 12/1955 | Wiselka | 43/43.13 |
| 2,741,863 | 4/1956 | Magill | 43/43.13 |
| 2,749,651 | 6/1956 | Snider | 43/43.13 |
| 2,798,331 | 7/1957 | Westdahl | 43/43.13 |
| 2,814,903 | 12/1957 | Banowetz | 43/43.13 |
| 2,843,966 | 7/1958 | Ingram et al. | 43/43.13 |
| 2,920,414 | 1/1960 | Koepplin | 43/43.13 |
| 3,524,277 | 8/1970 | Neubert | 43/44.88 |
| 3,568,355 | 3/1971 | Hassell | 43/43.13 |
| 3,940,871 | 3/1976 | Evans | 43/43.13 |
| 4,567,687 | 2/1986 | Even | 43/43.13 |
| 4,619,070 | 10/1986 | Jung | 43/43.13 |
| 4,879,834 | 11/1989 | Bohme | 43/43.12 |

Primary Examiner—Kurt C. Rowan
Attorney, Agent, or Firm—Wells, St. John, Roberts, Gregory & Matkin

[57] ABSTRACT

A fish line rudder facilitates carrying a fish line in current to either or both sides of a boat, or guiding the fish line laterally to current flow within a stream. The rudder includes an elongated body with opposed arcuate wing members. A central radial rudder plate extends axially along the body between the two wing members. The body includes an open central longitudinal bore that is slightly inclined upwardly from the front bore end toward the rear, to slidably receive the fish line therethrough. A line grip, on the rudder plate releasably secures a point along the fish line extending forwardly of the bore. The line extends forwardly from the grip to the fish pole and rearwardly through the body from the open front end and line grip, to a hook. When in the water, the device will react to resistance offered by the fish line, to move the fish line laterally across current, to locate the fish line according to the fisherman's desire. The fish line can be manipulated to cause the device to shift positions and move back and forth as desired in the current. The gripped section of the fist line can be released by a sudden tug, as when a fish bites. The rudder then rolls over and aligns with the fish line, allowing the fish to be played without the rudder offering significant resistance.

20 Claims, 4 Drawing Sheets

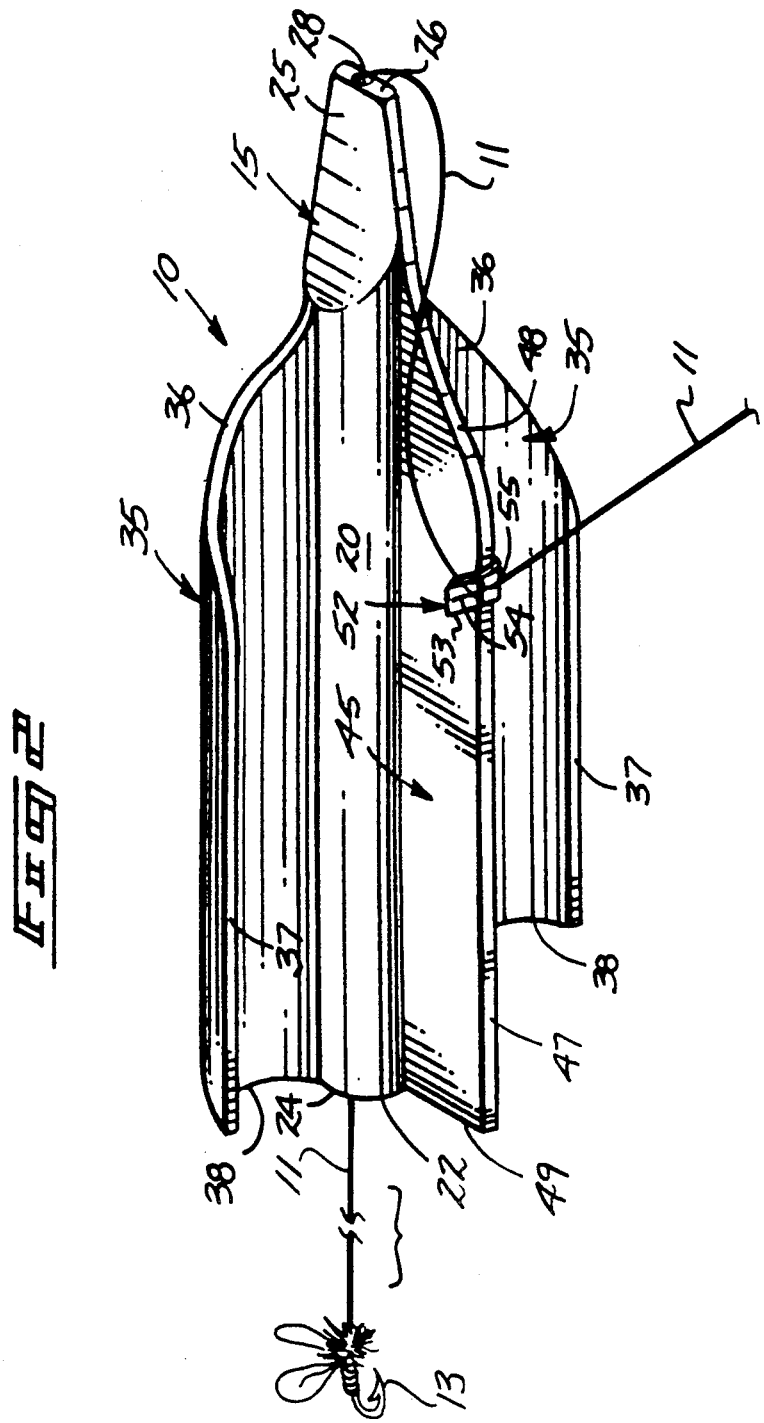

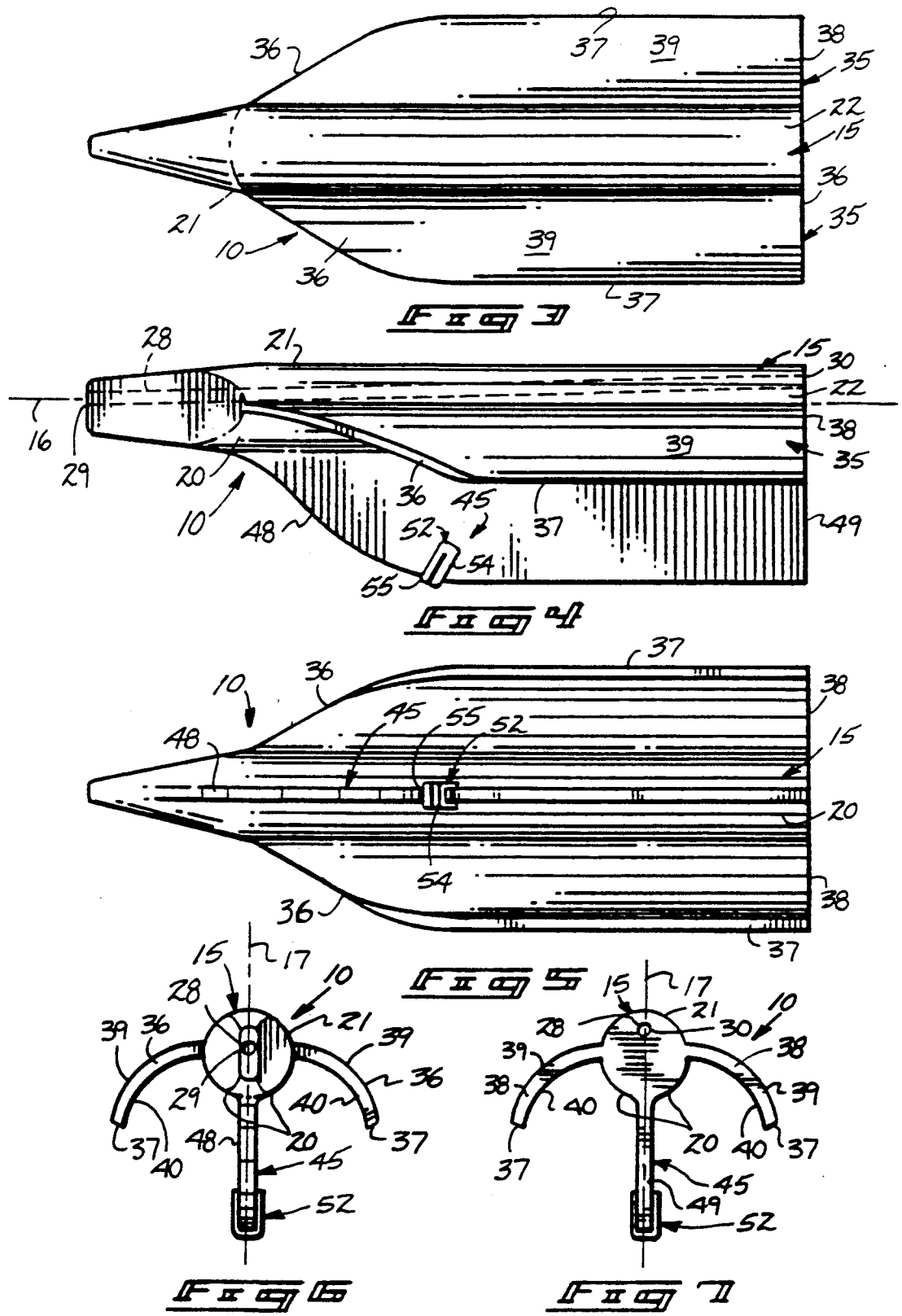

FISH LINE RUDDER

RELATED APPLICATIONS

This is a continuation-in-part of copending application Ser. No. 530,067, filed May 29, 1990 and titled "Fish Line Rudder".

TECHNICAL FIELD

The present invention relates to apparatus attachable to fishing lines for the purpose of carrying the fishing line to one side of a boat or to a selected lateral position within a stream, and more particularly to such a device that will facilitate movement in opposed lateral directions within a water current.

BACKGROUND OF THE INVENTION

It is desirable when fishing from a boat or a stream, to place the bait at a desired location within the current or water behind the moving boat. To this end, various apparatus have been developed to facilitate movement of the bait in response to forward motion of the boat or water current.

U.S. Pat. No. 2,255,465 to Hickey discloses another form of float. This float is provided with features to facilitate a "zig-zag" motion to lateral sides of a boat or other appropriate station. The float moves angularly against the current to pull the fish line to one side of the fisherman. In order to switch directions, the user must "whip the line" in order to move a ring that slides along a longitudinal rod on the float to shift the direction of pull and alter the angular orientation of the float. No disclosure is made of an apparatus for releasing the float from its angular orientation to allow normal play and landing of a fish.

A directional float apparatus is described in U.S. Pat. No. 2,798,331 to Westdahl. This device is described as a trolling float and basically represents an obstruction that is held angularly against the current, from the shore or from a moving boat. The angular orientation of the float relative to the fish line, causes the float to move in a laterally outward direction, away from the boat or the user's station along the shore of a moving body of water. The amount and direction of lateral travel is determined by the side of the device to which the line is attached.

Alternate motion of the float to an opposite direction is facilitated by adjustment features on the float. The line may be connected to either lateral side of the float to influence movement of the float in opposed directions behind the trolling boat or from the shore. However, to facilitate the change in direction, the float must first be pulled in and the line re-connected by the user.

The Westdahl float also includes a line release arrangement that facilitates release of the float from its normal relatively stationary position along the fish line in response to a "bite" or tug from the bait end of the fish line. Once the float is freed to turn with the current, the line straightens and the float slides along the length of the line toward the bait end.

U.S. Pat. No. 3,524,277 to Neubert discloses a trolling device with a line release mechanism. This trolling device is used, as are others, for drawing the fishing line to a location substantially "normal to the direction of current flow." A rearward end of the device includes a line release mechanism, and wings to opposed sides of a central vane include holes which the fish line is threaded through. The device will carry the bait out into the current. When a fish strikes the bait, the line will be released and the device will slide freely along the line to facilitate retrieval of the fish.

Either of the selected holes on the side wings of the Neubert device must be used in to facilitate an alternate direction of movement for the device. Once the fish line is secured through one of the holes, the direction is determined and cannot be changed without disconnecting the line and rethreading it through the opposite hole.

Though the above apparatus work to varying degrees, there remains a need for a fish line rudder that will allow a fisherman the alternative of movement in opposed lateral directions with respect to current flow direction, and in which the device will automatically become aligned with the fish line once a fish is hooked to facilitate play and landing of the fish without offering any significant resistance beyond that offered by the fish.

BRIEF DESCRIPTION OF THE DRAWINGS

Preferred embodiments of the invention are described below with reference to the accompanying drawings, which are briefly described below.

FIG. 1 is a top perspective view of a fish line rudder exemplifying features of the present invention;

FIG. 2 is a bottom perspective view of the rudder exemplified in FIG. 1, only showing attachment of a fish line and hook;

FIG. 3 is a top plan view;

FIG. 4 is a side elevation view;

FIG. 5 is a bottom plan view;

FIG. 6 is a front end view;

FIG. 7 is a rear end view;

DETAILED DESCRIPTION OF THE PREFERRED EMBODIMENTS

Figure 11:
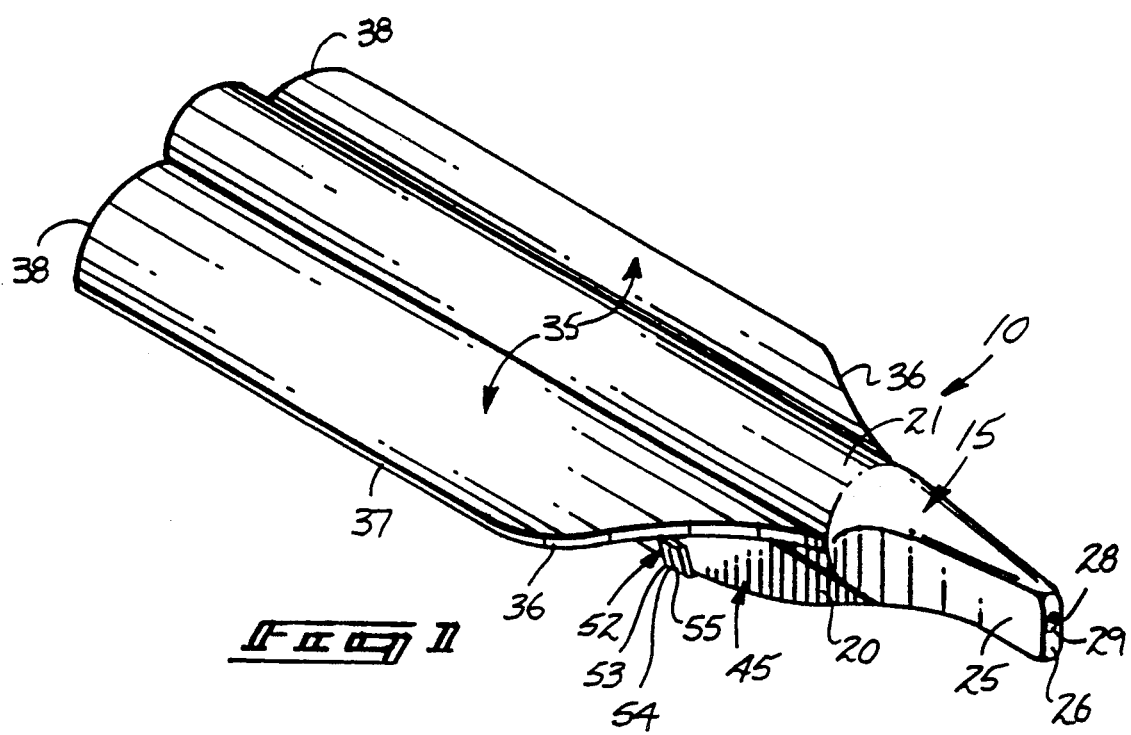
FIGS. 9-11 are diagrammatic operational views.

This disclosure of the invention is submitted in furtherance of the constitutional purposes of the U.S. Patent Laws "to promote the progress of science and useful arts" (Article 1, Section 8).

A rudder exemplifying preferred features of the present invention is illustrated in the drawings and is generally designated therein by the reference character 10. The present rudder 10 is provided to facilitate movement or guiding of a fishing line 11 (FIGS. 2, 8) in prescribed lateral directions in relation to a current.

Figure 8:
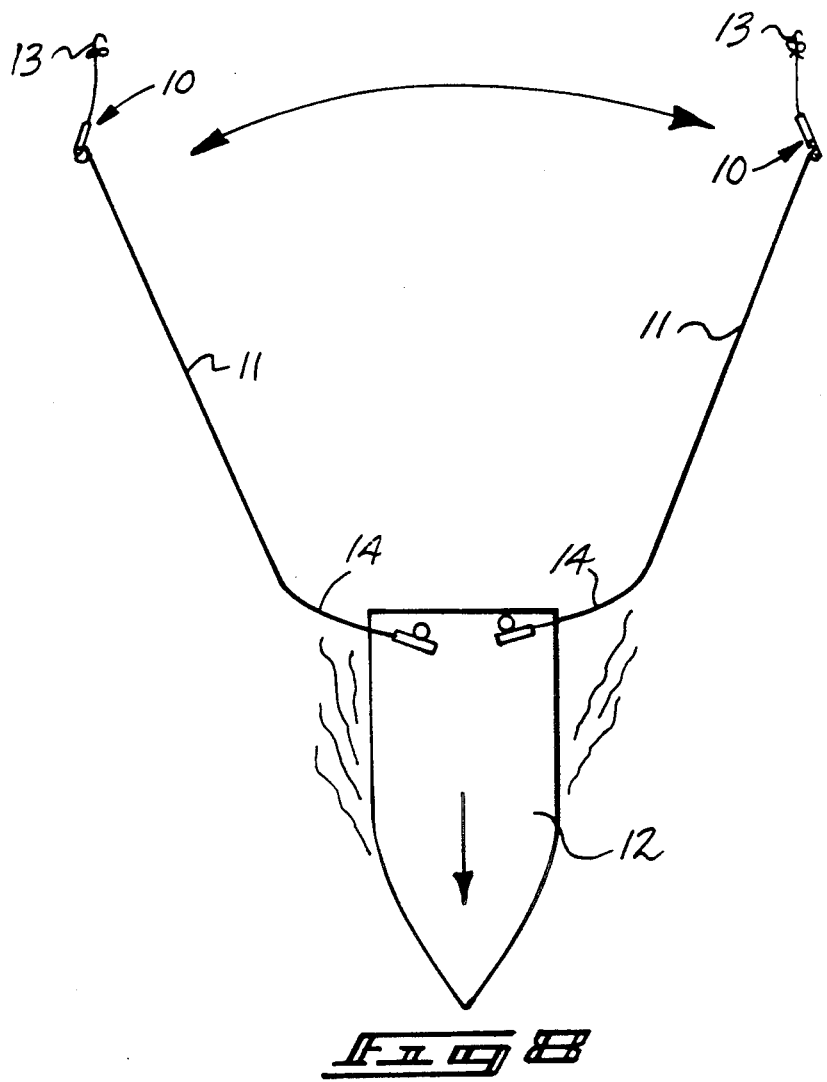
FIG. 8 is a diagrammatic view illustrating motion of the present rudder behind a boat.

The current may be established in still water by a forwardly moving boat 12, or by the flow of water as in a stream. The present rudder 10 operates within the current flow to carry the fishing line 11 and hook 13 laterally across the current as desired by the user. When fishing from a boat 12 as indicated in FIG. 8, the user may selectively change the lateral position of the fishing line between the position substantially shown. The fisherman is thus able to "zig-zag" the bait back and forth as desired, or otherwise place the bait wherever desired within a range determined only by the fish line length and the current (or boat) direction.

The present rudder 10, in a preferred form, includes an elongated body 15. In the preferred form, the body 15 is buoyant, constructed as a hollow plastic member or solid buoyant material. It extends along a central reference axis 16 (FIG. 4) and it has substantially bilateral symmetry to opposed sides of a vertical central reference plane 17 (FIGS. 6 and 7).

The central axis 16 is a reference used for descriptive purposes and lies within the vertical central reference plane 17, which is also used for descriptive purposes herein.

The elongated body 15 includes a bottom side surface 20 and a top side surface 21. The "top" and "bottom" are terms used with respect to the drawings to aid this description. Actual orientation of the rudder in use varies.

The surfaces 20, 21 together form a substantially cylindrical section in the preferred body configuration, leading from a rearward end 24 to a forward tapered section 25. The forward tapered section 25 leads on forwardly to a reduced front end 26.

The body 15 includes an open longitudinal fish line receiving bore 28. Bore 28 extends from an open end 29 at the reduced front body end 26, to an open rearward end 30 at the rearward body end 24. In referring to FIGS. 6 and 7, it will be seen that, in the preferred example, the bore is inclined, with the open end 26 spaced more toward the bottom side surface 20 than the rearward bore end 30. Thus, the bore 29 is not coaxial with the central axis 16 but is formed along an inclined axis as shown in FIG. 4 that is located within the vertical central reference plane 17.

A pair of elongated wings 35 extend in opposed directions outwardly from the body 15. The wings 35, in the example shown, are arcuate in cross-section (FIGS. 6 and 7) leading outwardly and downwardly from the body to axial side edges 37. As may be seen in FIGS. 6 and 7, the wings 35 are substantially bilaterally symmetrical to the central vertical reference plane 17.

In a preferred embodiment of the present fish line rudder, the wings 35 have negative buoyancy.

The wings include forward tapered sections 36 that lead along smooth curved edges inwardly toward the body forward tapered section 25. These edges are clearly shown in FIGS. 1-5 of the drawings. The tapered sections lead rearwardly to the axial side edges. The edges 37 are substantially parallel to one another and to the central longitudinal axis 16. They lead rearwardly from the tapered forward sections 36 to rearward ends 38 in a plane normal to the vertical central reference plane 17.

The arcuate wings each include a bottom concave surface configuration 40, and an upwardly facing to convex surface. The surfaces 39, 40 may be substantially concentric in cross section (FIG. 6) such that the thickness dimension of the wings between the two surfaces 39, 40 is consistent along the length of the wings.

A rudder plate 45 extends radially from the body with respect to the central axis 16. The rudder plate is substantially centered and bilaterally symmetrical along the vertical central reference plane 17 as indicated in FIGS. 6 and 7.

The rudder plate extends to a bottom axial edge 47 leading from a tapered front section 48 to a square rearward edge 49. Rearward edge 49, along with the rearward ends 38 of the wings, lie within a plane transverse to the vertical central reference plane 17 as clearly shown in FIGS. 3-5.

The rudder plate 45 is, in a preferred example, buoyant. As attached to the central body, the rudder will cause the body to maintain desired orientation in the water to facilitate use. The present fish line rudder also includes a line grip means 52 for releasably securing a fish line therein. Line grip means 52 in the preferred embodiment shown, is mounted to the rudder plate 45. It may be seen clearly in FIGS. 2, 4, and 5, that the line grip means 52 is situated adjacent to the tapered forward section 25 from the longitudinal center of the rudder. The line grip means determines the position or point along the body from which the line pulls and thereby affects the attitude of the body in the water.

The line grip means 52 preferably includes a resilient insert 53, formed with a slit 54 for receiving the fish line 11. The slit 54, shown in FIGS. 2 and 4) is angled such that an open end 55 is situated forwardly and the slit 54 extends upward and rearwardly therefrom substantially in the direction of pull from the fish line 11. The angular orientation of the slit is such that the line will be released upon a rearward tug at the bait. As may be noted in FIGS. 6 and 7, the line grip means 52 is located within the vertical central axis and is bilaterally symmetrical thereon.

Operation of the present invention may best be understood with reference to FIG. 8, which diagrammatically illustrates a boat 12 moving in a forward direction as indicated by the arrows. A fishing line 11 extends from the boat 12 to the present rudder 10 and, from its connection to the rudder 10, to a hook 13.

The connection to the present rudder 10 is typical regardless of the intended orientation of the bait with respect to the forward direction of the boat, or the current flow. The correct connection to the fish line is shown in FIG. 2. As shown, the fish line is threaded through the fish line receiving bore 28, and extends to the hook 62. The fish line, exiting from the forward end of the bore, is pulled rearwardly to engage the slit 54. The fish line 11 then extends from the slit to the fishing pole 14 as shown in FIG. 8.

Figures 9, 10, 11:
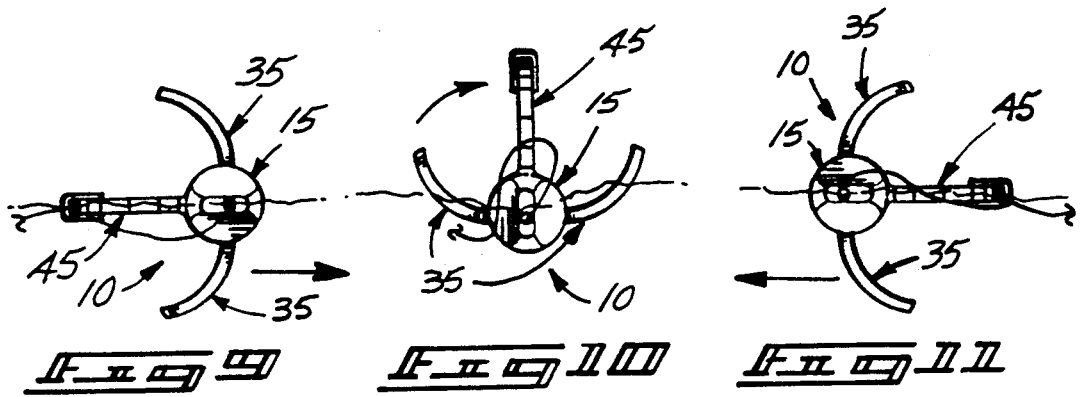

The configuration of the present rudder 10 and location of the line grip means 52 assures that the device will move to one or the other lateral sides of the boat or shore, depending upon the initial angular orientation of the device in relation to the current. By tipping the device to one side (see for example FIG. 9), and applying a constant resistance to lateral motion of the device, the fisherman is able to guide his bait 62 to one side. Then, if it is desired to cause the device to move to the opposite side, the fisherman will pull in the line and then suddenly release it or otherwise cause the line to temporarily go slack. This allows the rudder to invert or roll about its axis and temporarily align itself with the current (see FIG. 10). As the rudder flips over, the slack is taken up, and the rudder will move in a direction opposite to the initial direction of movement. Practice will develop a "feel" for the above procedure. By selectively alternating this procedure, the fisherman will be able to accurately place the bait nearly anywhere within range of the line length and in any water where there is current or motion a boat.

The line grip means 52 will selectively release the line either upon a sudden tug on the fishing line as applied by the fishing pole, or upon a fish biting the bait. The fish will apply tension along the line and cause the line to dislodge from the line grip means 52. This allows the fish line to extend in a relatively straight line and for the rudder to invert (to the FIG. 10 position) and align itself with the straightened line substantially coaxial with the bore 28. The rudder 10 will then slide down to a prepositioned stop, such as a bead or swivel (not shown) along the line, if one is provided. The fisherman is then able to pull the fish in without significant additional resistance offered by the rudder 10.

Once the line is reeled in, the device can be reset simply by connecting the fish line once again to the line grip means 52. The device is once again ready for use.

In compliance with the statute, the invention has been described in language more or less specific as to methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A fish line rudder, comprising:
   an elongated body formed on a central axis and having a top side surface and a bottom side surface leading axially from a rearward end to a forward tapered section and a reduced front end;
   a fish line receiving bore extending along a bore axis from a forward bore end at the reduced front end to a rearward bore end at the rearward end of the body;
   a pair of elongated wings extending in opposed directions outwardly from the body to side edges, said wings extending axially between the forward section and the rearward end;
   a rudder plate member extending radially from the body and centered on a central longitudinal reference plane;
   wherein the rudder plate extends axially along the body between the pair of elongated wings; and
   line grip means situated on the rudder plate member axially between the forward and rearward bore ends for releasably receiving and securing a fish line therein.

2. The fish line rudder as claimed by claim 1 wherein the bore is inclined with respect to the central axis with the forward opening end spaced radially toward the bottom side surface with respect to the rearward opening end.

3. The fish line rudder as claimed by claim 1 wherein the wings include forward sections tapering toward the body adjacent the forward tapered section thereof.

4. The fish line rudder as claimed by claim 1 wherein the grip means is located axially adjacent the forward tapered section of the body.

5. The fish line rudder as claimed by claim 1 wherein the grip means, the bore axis, and the central axis are situated within the longitudinal central reference plane.

6. The fish line rudder as claimed by claim 1 wherein the wings are of matched arcuate configuration in cross section, each with a concave surface facing downwardly and convex surface facing upwardly.

7. The fish line rudder as claimed by claim 1 wherein the body is buoyant.

8. The fish line rudder as claimed by claim 1 wherein the body is buoyant and wherein the rudder plate is buoyant.

9. The fish line rudder as claimed by claim 1 wherein the body and rudder are buoyant and wherein the wings have negative buoyancy.

10. The fish line rudder as claimed by claim 1 wherein the wings, rudder plate, and body rearward end terminate in a plane normal to the central reference plane.

11. The fish line rudder as claimed by claim 1 wherein the line grip means is comprised of a slit formed in the rudder plate axially adjacent the forward tapered section of the body and angled from an open end up and rearwardly.

12. A fish line rudder, comprising:
    an elongated buoyant body formed on a central axis bisected longitudinally by a central longitudinal reference plane and having a top side surface and a bottom side surface leading axially from a rearward end to a forward tapered section and a reduced front end;
    a fish line receiving bore with an axis within the reference plane extending from a forward bore end at the reduced front end to a rearward bore end at the rearward end of the body;
    a pair of elongated wings extending outwardly from the body to axial side edges, said wings including consistent cross sectional configurations extending axially between the forward section and the rearward end;
    a buoyant planar rudder plate member extending radially from the body and centered the reference plane and extending axially along the body; and
    line clamp means on the rudder member spaced radially outward of the bore and longitudinally bisected by the reference plane for releasably receiving and securing a fish line therein.

13. The fish line rudder as claimed by claim 12 wherein the wings include downwardly facing concave surfaces.

14. The fish line rudder as claimed by claim 12 wherein the wings are of negative buoyancy.

15. The fish line rudder as claimed by claim 12 wherein the wings, rudder plate, and body rearward end terminate in a plane normal to the central reference plane.

16. The fish line rudder as claimed by claim 12 wherein the central bore is inclined with respect to the central axis with the forward opening end spaced radially toward the bottom side surface with respect to the rearward opening end.

17. The fish line rudder as claimed by claim 12 wherein the body is substantially cylindrical in cross sectional configuration between the forward tapered section and the rearward end.

18. A fish line rudder, comprising:
    an elongated buoyant body formed on a central axis bisected longitudinally by a central longitudinal reference plane and having a substantially cylindrical section with a top side surface and a bottom side surface leading axially from a rearward end to a forward tapered section and a reduced front end;
    a fish line receiving bore with an axis within the reference plane extending from a forward bore end at the reduced front end to a rearward bore end at the rearward end of the body spaced radially toward the top side surface from the forward bore end;
    a pair of elongated wings extending outwardly from opposed points on the body to axial side edges, said wings including consistent cross sectional configurations extending axially between the forward section and the rearward end;
    a buoyant planar rudder plate member extending radially from the body, centered on the reference plane and extending axially along the body;
    line clamp means on the rudder member spaced radially outward of the bore and longitudinally bisected by the reference plane for releasably receiving and securing a fish line therein; and wherein the line clamp means is situated axially adjacent the forward tapered section.

19. The fish line rudder as claimed by claim 12 wherein the wings have negative buoyancy.

20. A fish line rudder, comprising:

an elongated body formed on a central axis and having a top side and a bottom side surface leading axially from a rearward end to a forward tapered section and a reduced front end;

means for receiving a fish line axially along said elongated body between the reduced front end and the rearward end;

a rudder plate member extending substantially radially from the body and extending along a central longitudinal reference plane between the pair of elongated wings; and line grip means on the rudder plate member axially between the reduced front and rearward body ends, for releasably receiving and securing a fish line therein.

* * * * *